US007848704B2

(12) United States Patent
Smith

(10) Patent No.: US 7,848,704 B2

(45) Date of Patent: Dec. 7, 2010

(54) LOCATION SYSTEM FOR BLUETOOTH ENABLED DEVICES

(75) Inventor: Sherry Smith, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 421 days.

(21) Appl. No.: 11/072,150

(22) Filed: Mar. 4, 2005

(65) Prior Publication Data

US 2006/0199534 A1 Sep. 7, 2006

(51) Int. Cl.
*H04B 7/00* (2006.01)

(52) U.S. Cl. ..................... 455/41.2; 455/41.1; 340/539; 340/568.1; 340/573.4

(58) Field of Classification Search ................ 455/41.2, 455/574, 41.1; 340/539, 573, 573.4, 328, 340/568.1, 988
See application file for complete search history.

(56) References Cited

U.S. PATENT DOCUMENTS

| | | | | |
|---|---|---|---|---|
| 6,563,427 | B2 * | 5/2003 | Bero et al. | 340/573.1 |
| 2001/0019956 | A1 * | 9/2001 | Tada | 455/434 |
| 2002/0036569 | A1 * | 3/2002 | Martin | 340/573.1 |
| 2003/0122671 | A1 * | 7/2003 | Jespersen | 340/568.1 |
| 2004/0002348 | A1 * | 1/2004 | Fraccaroli | 455/456.3 |
| 2004/0046658 | A1 * | 3/2004 | Turner et al. | 340/539.11 |
| 2005/0197064 | A1 * | 9/2005 | Ibrahim et al. | 455/41.2 |
| 2006/0029015 | A1 * | 2/2006 | Hinsey | 370/328 |
| 2006/0173781 | A1 * | 8/2006 | Donner | 705/50 |

FOREIGN PATENT DOCUMENTS

| | | |
|---|---|---|
| CN | 1298250 | 6/2001 |
| GB | 2400711 A | 10/2004 |
| JP | 2003274441 | 9/2003 |
| WO | WO-03/030122 A | 10/2003 |

OTHER PUBLICATIONS

Specification of the Bluetooth System, Version 1.2, Nov. 5, 2003, pp. 1-1200.

Madsen et al., Bluetooth Scatternet With Infrastructure Support: Formation Algorithms, Consumer Communications and Networking Conference, 2005. CCNC. 2005 Second IEEE.

* cited by examiner

*Primary Examiner*—Tuan H Nguyen
(74) *Attorney, Agent, or Firm*—McAndrews, Held & Malloy, Ltd.

(57) ABSTRACT

A method, apparatus, and system for tracking and locating BT enabled devices is described. A network of BT sniffers can be used to rapidly locate lost devices and their owners. Wearable child devices maintain low power contact with parent devices until such time as a signal limit is reached, at which point the parent devices alarm. An optional network of fixed sniffing devices can be used to coordinate a search for lost child devices once an alert is issued to the system.

27 Claims, 9 Drawing Sheets

LOCATION SYSTEM FOR BLUETOOTH ENABLED DEVICES

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for locating (BT) devices. Aspects of the invention are especially adapted for use in a system that provides warnings when a device is no longer in the proximity of a BT device and for subsequently locating that device in an area, such as a building.

BACKGROUND OF THE INVENTION

Significant problems may arise when children are brought into public places. Specifically, children often wander away from their parents, become lost or confused, or worse yet, may even be abducted by strangers. Parents have few effective tools for preventing these potential problems or for locating children when such problems arise. Children are often determined to explore but are too young to understand directions to a central meeting point or understand what to do if they are lost. Mechanical restraints are psychologically unappealing. At the same time, operators of malls, amusement parks, and other large venues where children are likely to be guests spend considerable resources in locating lost children. Until they are found, lost children generate considerable anxiety for the parents. There are currently no effective and reasonably priced active electronic devices available that will both alert parents that a child is wandering and allow for an effective, rapid search if a child is lost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for tracking a BT device. The method may comprise the steps of attaching a parent device to a kid device, entering a power saving mode while receiving the signal of the parent device above a specified threshold, entering a search mode when the signal of the parent device falls below a specified threshold, and then returning to a power saving mode when said parent device signal is reacquired. Additional steps may include having the kid device attach to the parent device, issuing an alarm when the received kid signal falls below a threshold, entering a search mode when the signal of the kid device is lost, or returning to a power saving mode when the kid signal is reacquired. Another method of the invention involves tracking a BT device within a network of BT devices by providing a network of connected BT sniffing devices, commanding the sniffing devices to search for a unique hardware identifier associated with a BT e nabled device, and reporting the unique hardware identifier and the hardware identifier of the sniffing device to a central computer when the sniffing device acquires the sniffing signal of the BT enabled device with the unique hardware identifier. The network may also activate an alarm at the connected sniffing device that has acquired the BT enabled device.

The system may comprise a plurality of sniffing devices, one or more BT enabled, wearable devices, each such device having a unique identifier, and a central monitoring system. The central monitoring system is connected to the sniffing devices in a network. The sniffing devices ("kid sniffers") may include an alarm. The network may be a wireless network. The sniffing devices may be BT enabled devices. Optionally, the wearable devices ("kid devices") may be normally dormant in the presence of an associated parent device. The wearable devices may enter an alarm state when said wearable devices detect that the RSSI of an attached device has fallen below a threshold.

Aspects of the invention may be substantially integrated onto a chip, for example a BT chip, the chip having machine-readable storage having stored thereon a computer program having a code section for the tracking of other BT devices. The program may include at least one code section being executable by a machine for causing the machine to perform steps comprising those substantially as shown and described with respect to FIG. 6.

The integrated circuit of the invention may also include an application layer that performs the methods of the invention. The integrated circuit may also include a signal line activated by a cradle for controlling the application layer when said integrated circuit is resting in a cradle. The integrated circuit is desirably connected to a BT radio. The application may return to a power saving mode when the measured RSSI exceeds a threshold, or enter a BT inquiry mode state when said measured RSSI falls below a threshold. The integrated circuit may also have a unique hardware ID.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for locating children. More particularly, certain embodiments of the invention may be found in a method and system for locating proximate BT devices and warning when a BT device leaves the proximity of another BT device.

BT wireless technology is set to revolutionize personal connectivity by providing freedom from wired connections. BT is a specification for a small form-factor, low-cost radio solution providing links between mobile computers, mobile phones and other portable and handheld devices. Of particular interest is BT's low power consumption and short range, coupled with the ability of BT devices to automatically attach to other BT devices that are close by, typically within 10 meters or less.

About BT

BT wireless technology is an international, open standard for allowing intelligent devices to communicate with each other through wireless, short-range communications. This technology allows any sort of electronic equipment—from computers and cell phones to keyboards and headphones—to make its own connections, without wires, cables or any direct action from a user. BT is currently incorporated into numerous commercial products including laptops, PDAs, cell phones, and printers, with more products coming out every day.

How BT Works

Figure 1:
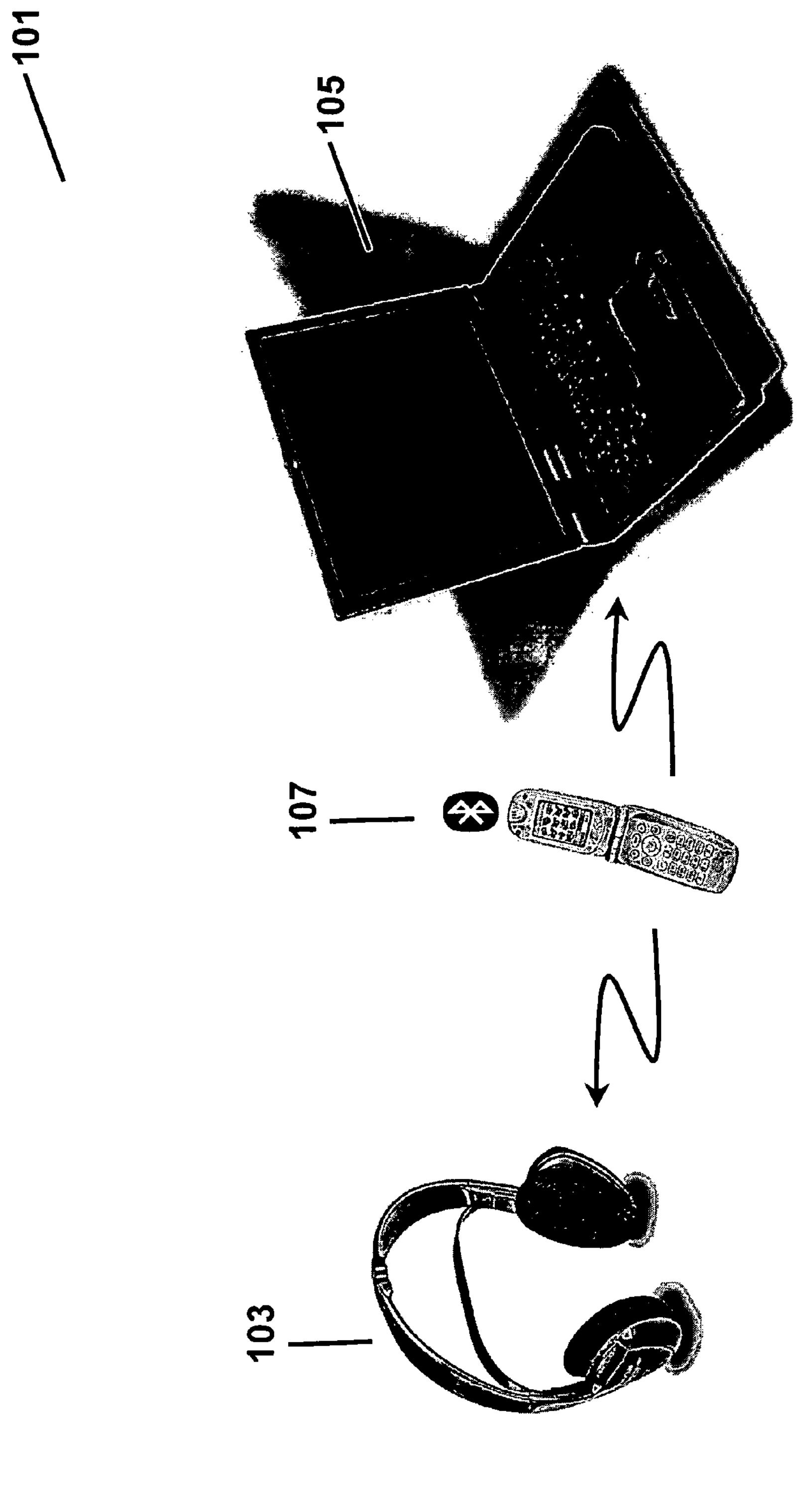
FIG. 1 is a diagram illustrating a basic BT piconet.

BT is a frequency hopping spread spectrum (FHSS) radio system operating in the 2.4 GHz unlicensed band. Its low power transmissions allow a typical range of about 10 meters. Devices connect to each other to form a network known as a piconet, with up to seven active devices in the piconet. FIG. 1 shows a piconet 101 that includes three BT enabled devices: a headset 103, a laptop computer 105, and a cellular phone 107. The maximum data throughput between devices is approximately 723 kbps with the data capacity shared between devices on the piconet.

Figure 2:
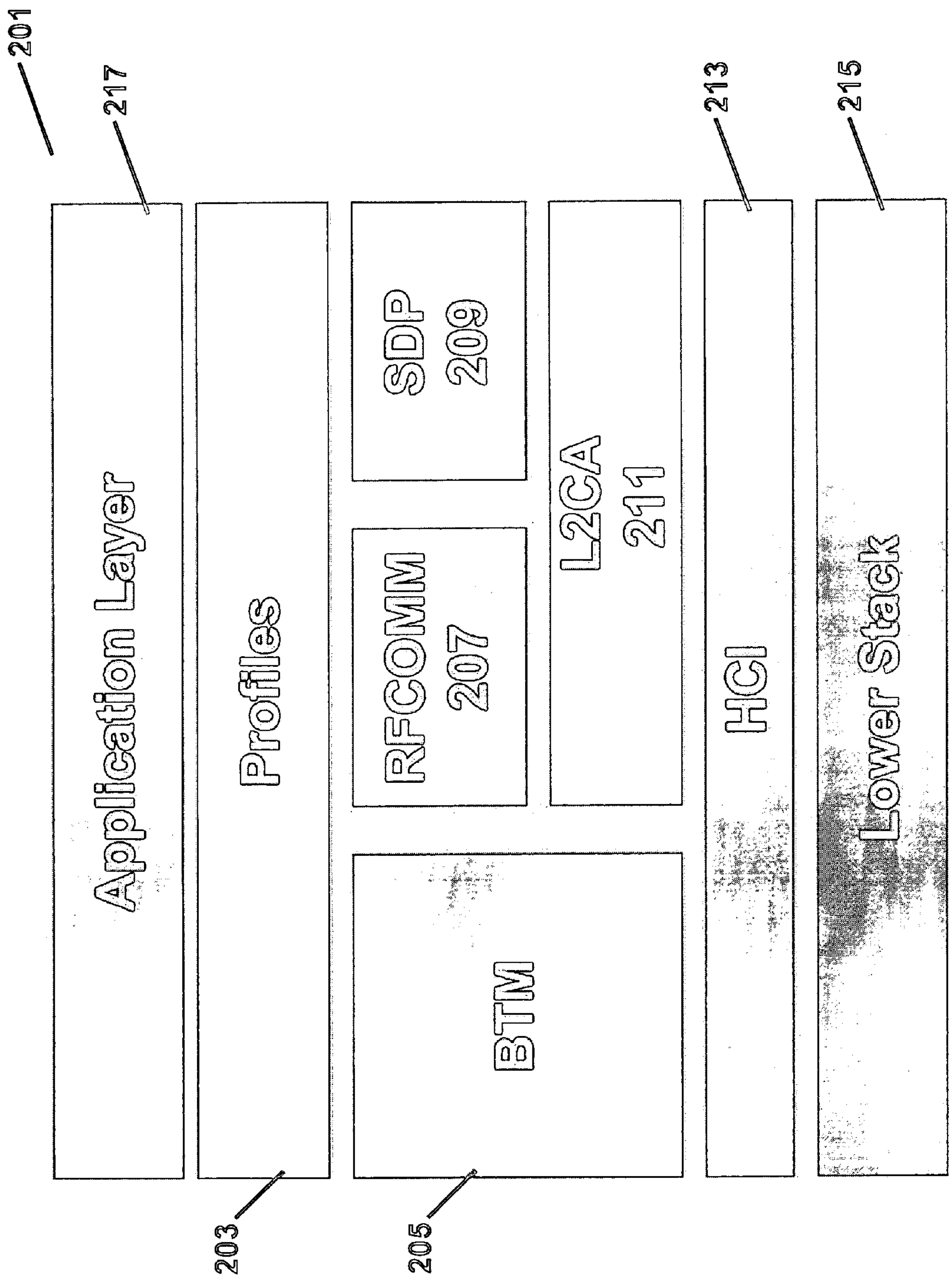
FIG. 2 is a simplified exemplary protocol stack.

BT has a protocol stack to transfer data and implement the advanced features required by applications. The protocol stack consists of several different protocols designed for different purposes. The profiles, or applications, reside above the protocol stack. BT also has a lower protocol stack for link management and baseband control. FIG. 2 is a simplified exemplary protocol stack 201. The stack includes Profiles 203, a BTM 205, RFCOMM 207, SDP 209, L2CAP 211, HCI 213, and Lower Stack 215. The application layer 217 contains the computer programs that actually implement useful tools that take advantage of the BT functionality.

Figure 3:
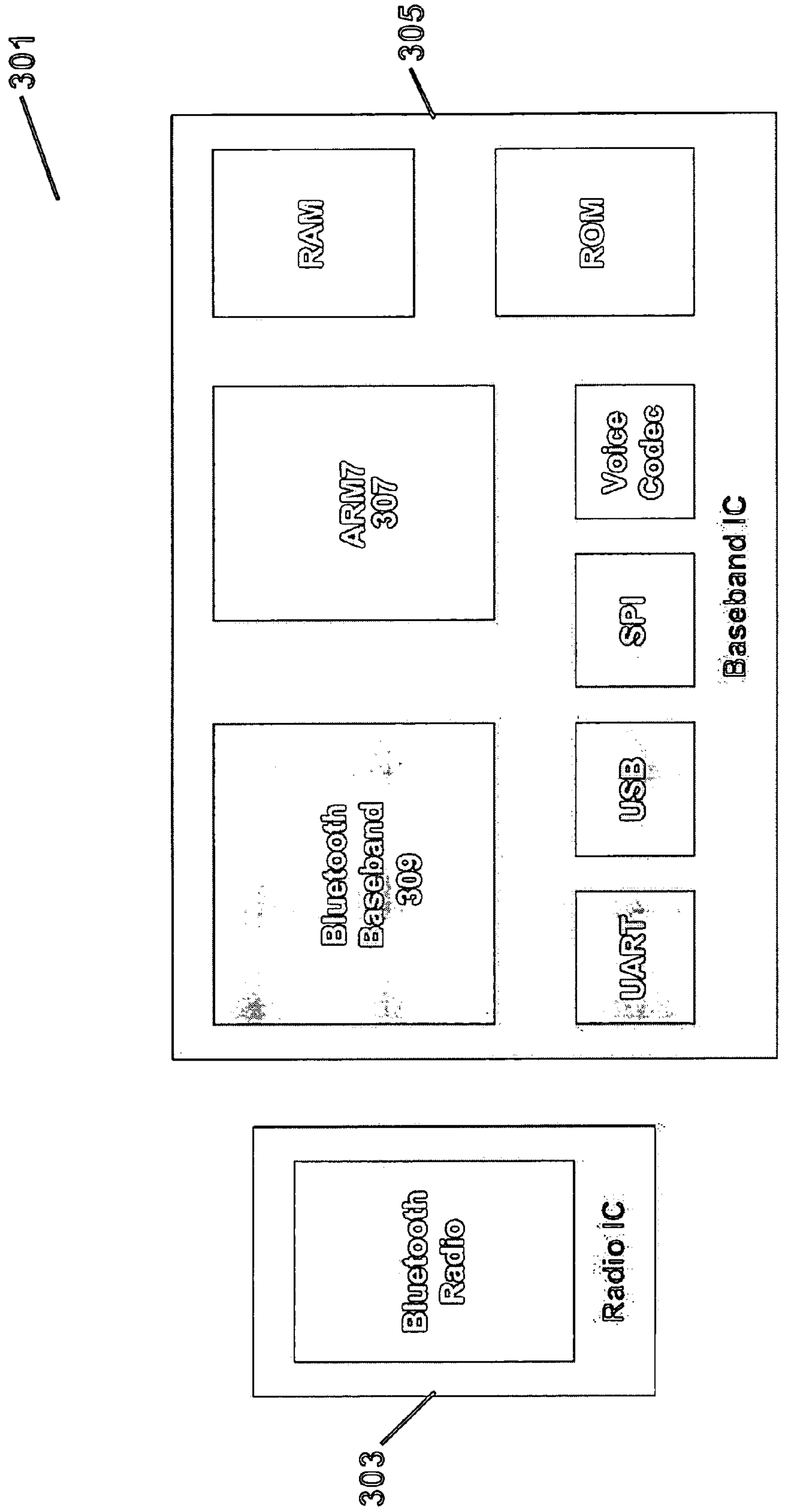
FIG. 3 is a block diagram illustrating an exemplary BT hardware implementation, used in the devices of FIGS. 4, 5, and 7, for example, that runs the protocol stack of FIG. 2, for example, in accordance with an exemplary embodiment of the present invention.

BT hardware implementations are typically highly integrated systems consisting of one or two chips. FIG. 3 is a block diagram illustrating an exemplary BT hardware implementation, which includes a Radio IC 303 and a Baseband IC 305.

The BT baseband chip consists of a processor core such as an ARM7 with integrated memories 307, BT baseband 309, and several other peripherals. The radio is implemented in a separate chip 303. The ARM7 processor runs all the required software including a lower stack, an upper stack, and an embedded profile. This type of single CPU implementation allows for a small, low power, low cost solution.

The software "stack" contemplates the insertion of useful applications in the higher layers of the stack. These applications can be designed to take advantage of BT's lower layers to implement functionality based on BT radio links.

Three low power modes are specified by BT, namely, sniff mode, hold mode and park mode. For sniff mode, in normal piconet operation, a device turns on its receiver for its assigned time slot. In sniff mode the device negotiates a regularly spaced interval such that it only needs to turn on its receiver on this interval. A typical sniff interval is 200-1000 milliseconds (ms). The device run may have a SCO (audio) connection open and exchange data over an ACL link. The device will stay in sniff mode until switched back to active mode. Hold mode is similar to sniff mode but on a one-time basis. During hold mode, the device will not receive packets for the hold interval but when the interval ends the device goes back to active mode. The device may have a SCO connection open. In park mode, the device is no longer an active member of the piconet. It periodically listens for beacon packets to maintain synchronization to the piconet. SCO connections are not opened and data is not exchanged on the ACL link. A device will stay in park mode until it is switched back to an active operating mode.

One low power mode is possible on an ACL link between devices. In addition, when switching between modes the device first enters active mode. For example to switch from park to sniff the device switches from park to active to sniff. In accordance with an embodiment of the invention, for low power management, each application sends events to the low power manager. These events may comprise: protocol connection open; protocol connection closed; application open; application closed; SCO open, SCO closed; connection idle; connection busy; and power mode changed to active. Each application has a table indexed by these events. The entry in the table indicates the low power mode preference to take based on that event. There may be more than one low power mode per entry, indicating at least a first preference. For example the first choice may be sniff. If sniff mode fails, the second choice is park. A timer value may also be associated with each mode, such that the low power mode switch will take place after the timer expires.

In an exemplary embodiment, the system utilizes at least two devices, a parent device and a kid device. The parent device can be any BT enabled device, such as, for example, a cell phone with BT. The kid device is again, any BT device, such as, for example, a high volume, low cost, specialized device optimized for low power consumption. The kid device is designed to be wearable, and can take the form of a wrist watch, ankle bracelet, key fob, or any other convenient shape. The kid device includes a rechargeable battery with sufficient power for approximately 24 hours of operation. When not in use, the device is stored in a cradle that keeps the kid device fully charged.

Figure 4:
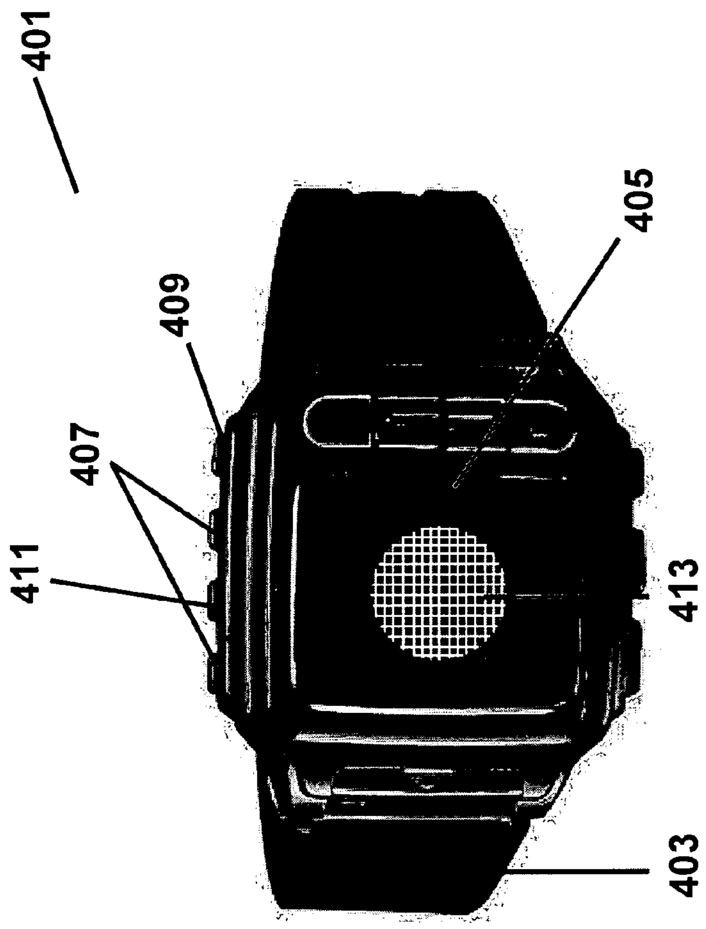
FIG. 4 shows a wearable "kid locator" device, in accordance with an exemplary embodiment of the present invention.
Figure 5:
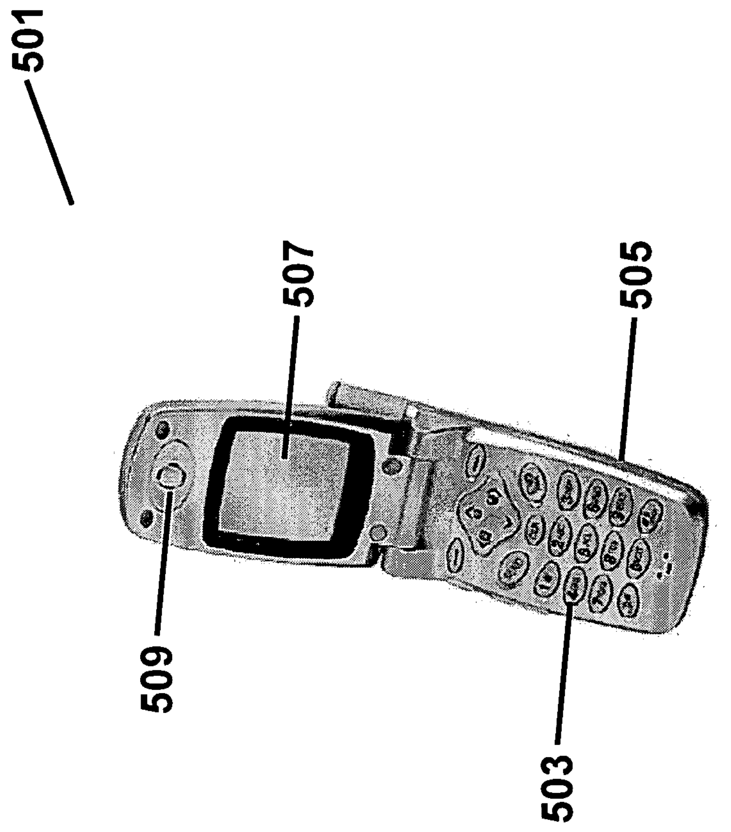
FIG. 5 shows a wearable "parent" device, in this case a cell phone enabled with BT technology, in accordance with an exemplary embodiment of the present invention.

FIG. 4 shows an exemplary kid device 401. As shown, it includes a wrist band 403, faux watch face 405, and external contacts for charging 407. It also includes user operated contacts 409 for invoking attachment, de-attachment, and other basic features for user control. Contact 411 is used for control when the device is cradled. It is contemplated that the device would also include an integrated BT chipset 301, such as for example the Broadcom BCM 2035 chip or any other BT chipset that implements the BT "hold" mode. Other form factors are possible, such as ankle bracelets, "fobs" worn as necklaces, or any other convenient, wearable shape that can incorporate the BT chipset and a battery allowing for a reasonable period of operation.

The system is initialized by "attaching" the kid and parent devices. Attachment is accomplished using the BT protocol for this purpose. Attachment is performed between the two devices at any convenient time, and can be triggered for example by menu selection on the parent cell phone 501 and a button press 409 on the kid device. The processes discussed below are described in detail by the BT protocol, most recently document Core Specification v2.0+EDR Volume 3 Core System Package [Host volume] Part C: Generic Access Profile Section 7: Establishment Procedures.

Figure 6A:
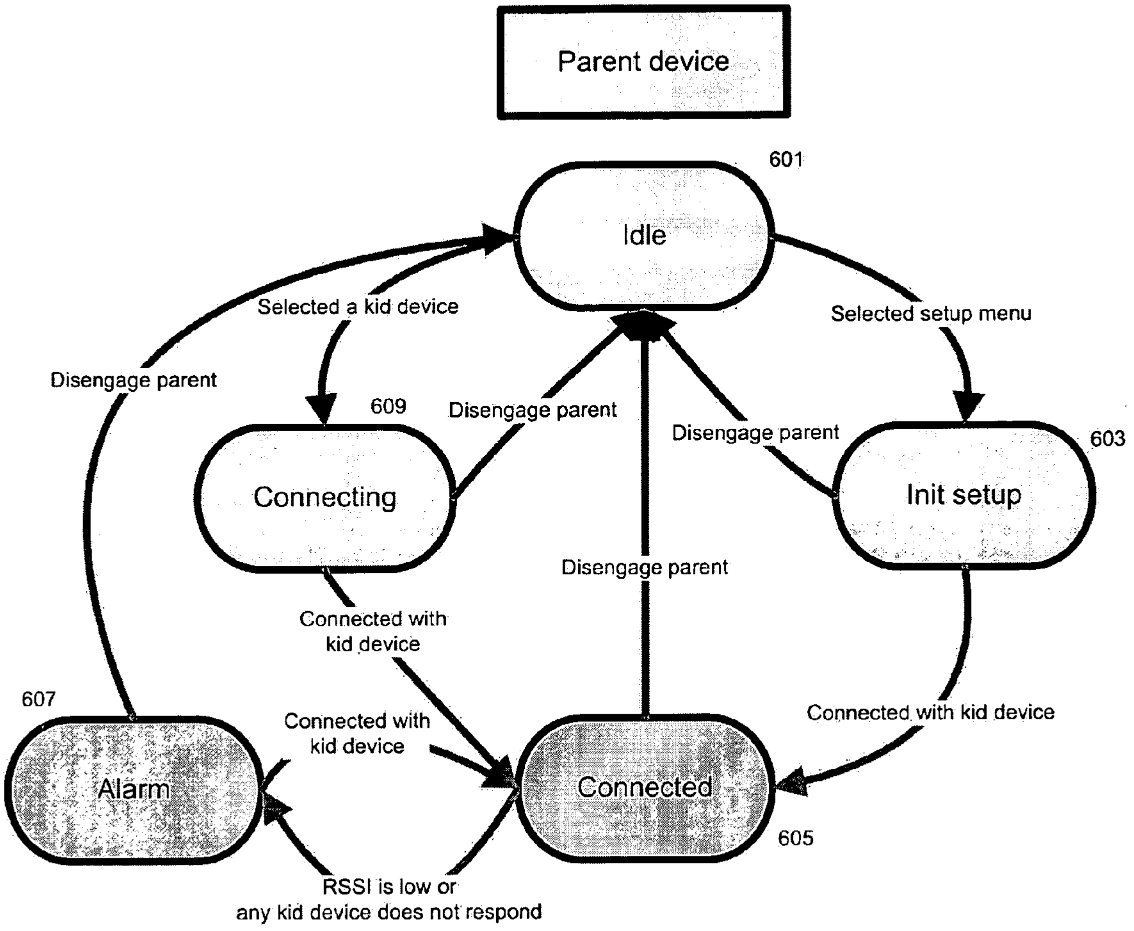
FIG. 6 is a state diagram showing the various states that the parent (FIG. 6A) and kid (FIG. 6B) devices may enter, in accordance with an exemplary embodiment of the present invention.
Figure 6B:
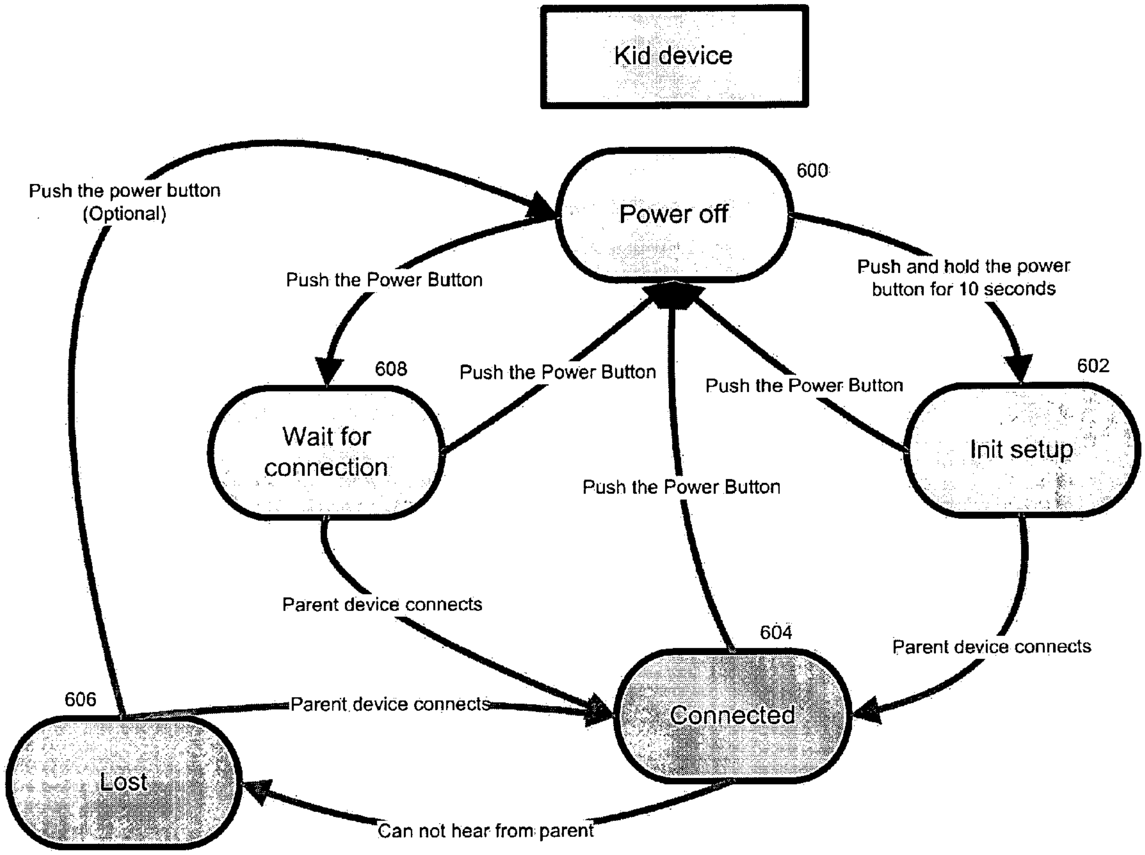

Reference to FIGS. 6A and 6B is helpful for understanding one exemplary embodiment of the operation of the kid and parent devices. It will be appreciated that the inquiry process in BT is the process whereby a BT device finds out what other BT devices are in range. The page process is the process of connecting to a specific device. A BT device that is in discoverable mode is a device that is scanning for inquiry, i.e., if other devices start an inquiry process, the device will answer the inquiry. In non-discoverable mode, the BT device will not answer inquiries. A device that is in connectable mode is scanning for BT paging, i.e., if other devices start a paging process for this device, it will answer the page. In non-connectable mode, a BT device will not answer a page. Finally, a "hold" mode is one of the BT specified low power modes.

For the parent device, the initial state is an idle state 601. Based on a menu selection, the parent device can transition to an initial setup state 603. In initial setup state 603, the parent device starts an inquiry process to find possible kid devices. The user interface may offer a list of candidate devices, and the user selects from the list. The kid device is then paged. If the page succeeds, the parent device transitions to the connected state 605. In the connected state 605, the kid device and the parent device negotiate on a sleep time for the hold mode. When the parent device wakes up, it reads RSSI. The parent device also sends a message to all the connected kid devices and remains awake to receive a response. If the message is not answered within a set time, for example 10 seconds, the parent device will again transition to the alarm state 607. If any of the connected kid devices have a read RSSI that is below a set threshold, the parent device transitions to the alarm state 607. Once in the alarm state, the user is alerted with the name and address of the lost kid device. Once the kid device is reacquired, the parent device transitions back to the connected state 605, unless the user chooses to disengage the parent device in which case the parent device transitions to the idle state 601. Note that if the kid device has already been paired with the parent device, the parent device can transition directly from the idle state 601 through the connection process 609 to the connected state 605.

The states for the kid device are similar to those for the parent device. Initially, it is assumed that the kid device is off in state 600. Power is activated by a button press. The press may be longer if it is desired to enter the initial setup state 602. In the setup state 602, the kid device is discoverable and connectable. When a parent device connects, the kid device can then transition to the connected state 604. In the connected state, the kid device is set such that it is in a non-discoverable and non-connectable mode. The kid device will only talk to the connected parent device. The kid device and the parent device agree on a sleep time and enter hold mode. When the kid device wakes up, it will stay awake until it receives a message from the parent device. If the message is not received within a minimum time, for example 10 seconds, the kid device will enter the lost state 606.

In the lost state 606, the device is discoverable and connectable. The kid device will allow itself to be discovered by, and connected to, any device that is performing inquiries or that is paging the device. Lost state can only be exited by either complete loss of power, resulting in the total reset of the kid device, or connecting with the original parent device and returning to the connected state 604. Timers can be advantageously employed in the lost state 606 to extend the life of the kid device battery in the event that connection is not quickly established with the parent device. Optionally, the kid device could be allowed to transition from the lost state 606 by a button press on the kid device, however as a security feature it is contemplated that it may be preferable to only allow power on/off and setup for the kid device in the presence of the paired parent device.

It will be noted that as a security feature, the kid device 401 can therefore only be logically detached when it is in proximity to the device that it is currently attached to. Furthermore, the kid device is always "on" in the sense that it is only deactivated when it senses that it is both in proximity to its attached device or in a cradle. In this respect, the kid device can be made not to turn off when in the lost state 606 except by physical destruction or the exhaustion of its power supply.

Once attached, the parent device interrogates the lower stack 215 for the value of RSSI. BT devices track RSSI, and this value is available to application layer software. The application layer in the parent device 501 queries for an updated RSSI value at intervals that correspond to the hold mode sleep timer. The interval can be adjusted for security and power drain. It is contemplated that an update interval of approximately once every three seconds should be sufficient to provide reasonable warning and conserve power.

The kid device may be programmed to change states only when parent contact is lost for a minimum number of cycles. It is contemplated that this period would be approximately ten seconds, although longer or shorter periods could be selected based on commercial experience. The parent device RSSI threshold is preferred to be variable, allowing the parent to select through keypad 503 "longer" or "shorter" distances at which the parent device will change state based on the needs of the parent, up to the maximum BT range of about 10 meters. Note that at extremely low thresholds, an unusually favorable radio environment could keep the parent device from alarming at longer distances than desired, so it is contemplated that the RSSI threshold would be set above zero.

The kid device may be programmed to adopt a variable duty cycle for active radio transmission, wherein the device actively transmits more frequently in the initial period of being "lost" and less frequently after a period of time in order to conserve power while continuing to broadcast. Upon initially losing the parent device signal, the kid device may also audibly alarm speaker 413 with ring tones and/or vibrate. In the same way, the ring tones may be repeated at decreasing intervals depending on the battery capacity of the kid device.

The parent device will not change BT states unless acquisition is actually lost. Assuming that the RSSI threshold is sufficiently high, the parent device may generate an audible ring 1 warning from speaker 509 to the user to warn that the RSSI limit has been exceeded before contact has been lost. This ring provides a first level of warning that a child is wandering off and can be issued while the parent device is still in a connected state 605. If contact is actually lost and the device has transitioned to alarm state 607, then the parent device will begin paging the kid device and generate an audible ring 2 warning. The parent device may also display a message in the display area 507 of the parent device stating the time signal was lost and reciting the unique hardware device identifier number of the kid device that was lost.

When the parent device reacquires the kid device and returns to the connected state 605, an audible ring 3 may be generated by the parent device as well as a text message, and the parent device will transition to "hold" mode. When the RSSI threshold is met, the parent device will generate an audible ring 4 and display the message "kid # reacquired" in the message area. Ring or other tones 1-4 are optional and may be of any suitable tone to convey a message of alarm or reassurance, and are readily implemented on standard cell phone chipsets that allow for customized rings based on the source of the message. Other combinations of tones and/or vibration (from vibrating accessory 505) and text messages may be implemented based on design preference and the availability of call signaling features in the underlying parent BT enabled device.

Figure 7:
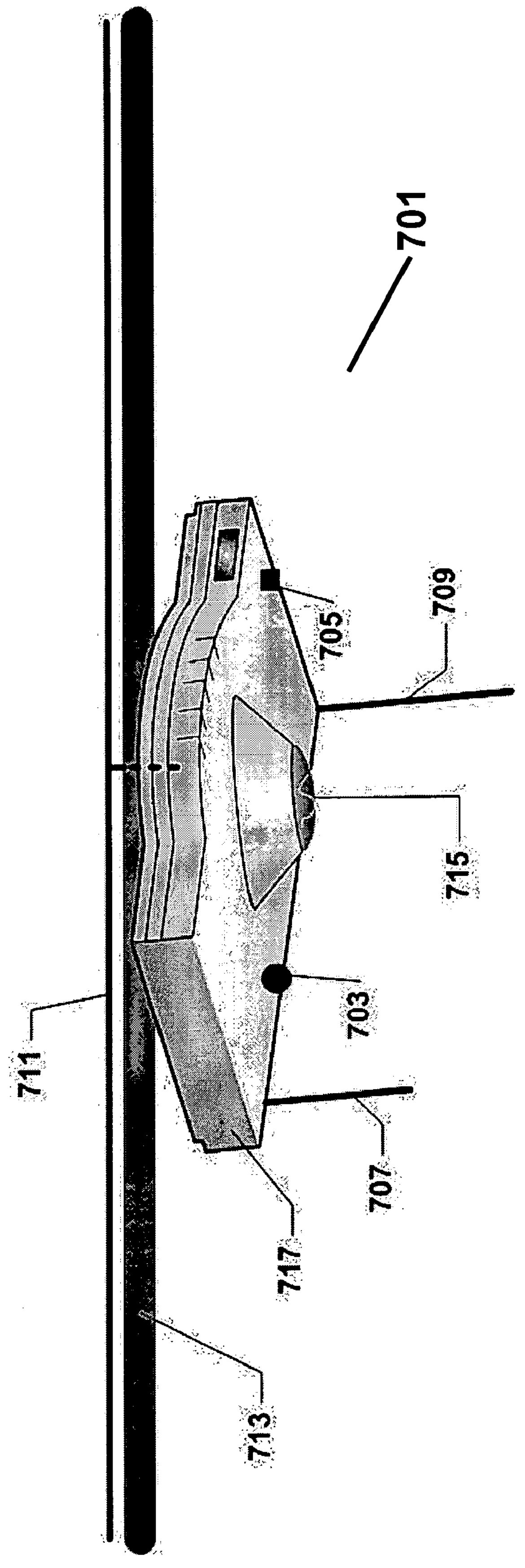
FIG. 7 is a "kid sniffer" device, intended for mounting in fixed or semi-permanent locations for purposes of establishing a "kid net" in an area, in accordance with an exemplary embodiment of the present invention.

FIG. 7 shows a diagram of a kid sniffer. The kid sniffer 701 is a BT equipped device with a form factor 717 comparable to a smoke detector that is intended to be deployed in areas, especially in ceilings 713 or poles above where children or other kid device users congregate, such as malls, amusement parks, and day camps. The kid sniffer employs a larger, long life battery, or may be permanently wired to AC power. The sniffer is equipped with a low battery flashing LED 703, a test button 705, a BT chipset 301 such as the BCM 2035, and a chipset implementing a second, wider area network protocol such as 802.3 (Ethernet) for connection to a hard-wired LAN backbone 711 or 802.11 wireless radio interfaces for connection to a wireless LAN base station 807, along with supporting antennas and/or physical connections. Antennas 707, 709 are mounted in any convenient location consistent with dual mode BT and 802.11 or other back side network operation, as necessary. The sniffer 701 may also have a visible strobe 715, noisemaker, or other alarm.

The logical functions of the sniffer are limited and sufficient space exists in the chipsets provided by Broadcom for BT and 802.x implementations that the overall complexity and cost of the sniffer hardware is kept to a minimum.

Figure 8:
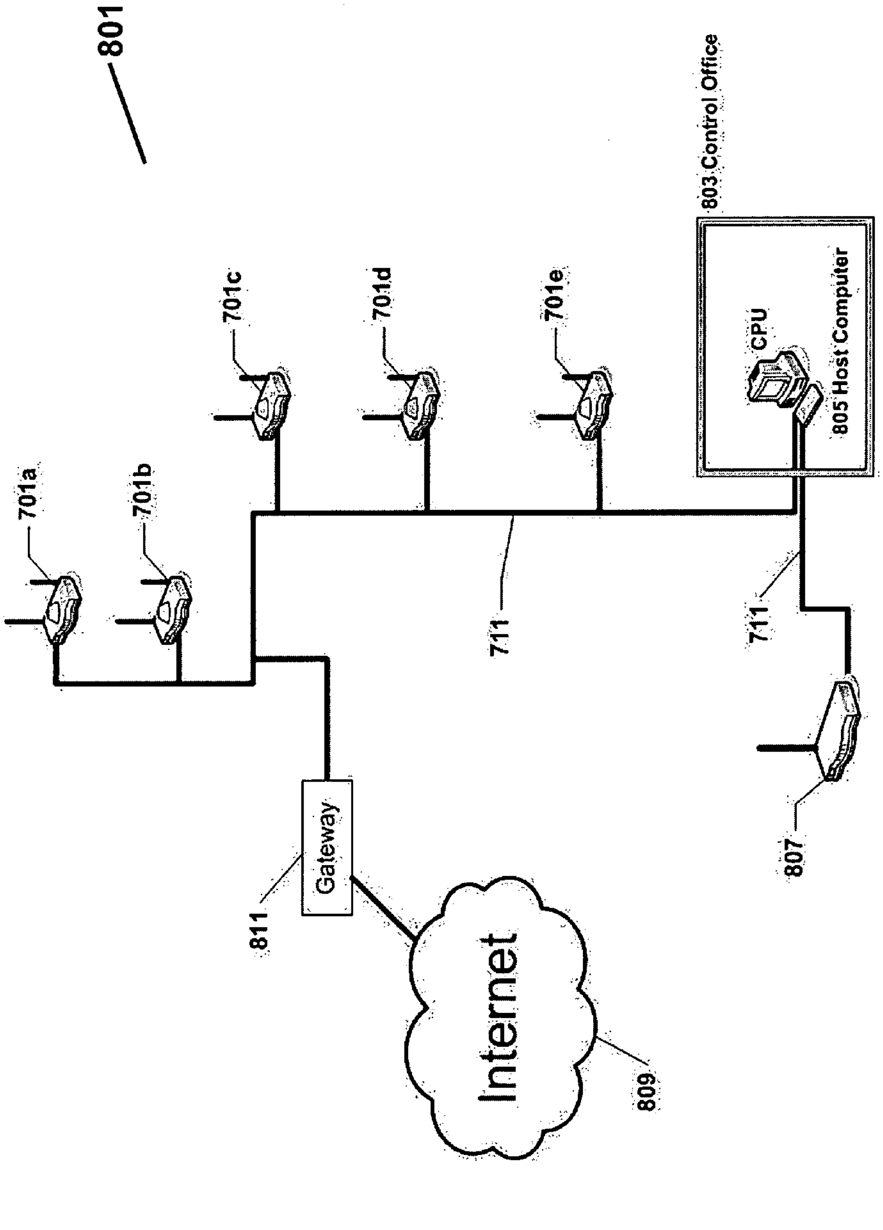
FIG. 8 is a diagram of a network of "kid sniffer" devices, for establishing a "kid net", in accordance with an exemplary embodiment of the present invention.

Operation of the sniffer network is described in reference to FIG. 8. In operation, the kid sniffers are normally dormant as BT nodes and sleeping on the "backside" or as LAN nodes 701*a-e*. The sniffer network 801 is connected to a central monitoring point 803, such as mall or amusement park security, the campus administration office, or other convenient point. The network 801 can contain any combination of wireless sniffers 701*f-h* and wired sniffers 701 *a-e* .

The central monitoring point includes a standard computer 805 equipped as a node on the network that manages the sniffer devices. If a parent device alarms and the parent or guardian notifies the administrative authority such as mall security, campus police, or camp administration, the unique device identifier of the kid device can be entered into the central system. The central system broadcasts a global command to all sniffer devices on its network to cycle from a dormant BT state to an active state where every kid sniffer device in the network performs inquiry scans and pages for the kid device. Each sniffer that "finds" the kid device reports back the RSSI and its own hardware identifier to the central computer.

It is contemplated that the central application will contain a current mapping of sniffer unique device Ids to physical locations. Note that because BT allows a single device to inquire for an unlimited number of physical associated devices, the central site can "seek" for as many lost devices at once as network capacity and memory will allow. Alternatively, the site can be preprogrammed with Ids of devices that it is desired to track continuously. Note also that it is not necessary to have a parent device 507 involved in this system at all: The central computer 805 is capable of tracking any BT device with the kid tracker application enabled whose unique device ID is known to the administrator. Once the last reported sniffer location is displayed, the information can be relayed to appropriate field personnel, either by voice radio or by automatic message generation over a wireless messaging system such as SMS or regular e-mail to designated PDAs.

It is also contemplated that any BT devices, that have access from the Internet 809 through gateway device 811 to network backbone 711, may be enrolled in the sniffer network. This allows roaming devices to participate in a search as well. The number of roaming devices is limited only by the ability of the network to enroll additional devices through the gateway 811 and communicate information about the unique ID of the kid device that is being sought, and the willingness of the holders of BT devices connected to those networks to participate in the search described. Eligible devices and networks would be pre-registered in a broadcast list of willing "Amber Alert" devices and networks that include BT enabled devices, maintained on central computer 805. When initiated by the system, roaming devices connected to the network 801 through the internet can thus enlisted to participate in an "Amber Alert" that involves hundreds or even thousands of BT enabled devices in a very large area search for a missing kid device. Any roaming device that successfully pages for the kid device then sends an e-mail message to the system operator with contact information. The central system may also be programmed with an automated reply that includes instructions on what to do next. The entire process can be automated to the point that once a BT device is enrolled in the program, the owner of the device does not need to take any action to participate in the search network, other than respond to any automated e-mails seeking location information in the event a kid device is found by the owners BT device.

A powerful, flexible system for providing short range tracking of wandering persons (or anything else that is mobile and needs watching) that can be built into the functionality resident in BT enabled devices. The kid application is sufficiently portable to other devices, for example, that the functions of FIG. 6 can be built into not just dedicated "kid" devices but any BT enabled electronic gadget that a kid may carry, including other cell phones, pagers, games, calculators, PDAs, music players, and so on. Factoring this technology into a wide range of kid products not only enhances the chances for widespread adoption, but also makes it more difficult for a predator seeking to abduct a child to determine whether or not a child is carrying a device with this technology. Also, by embedding the kid device in a device the child uses for other purposes, it is less likely to be discarded by the child. Finally, the invention provides a tool that can be used by the operators of large venues to rapidly find lost children and reduce parental panic.

Aspects of the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of tracking a Bluetooth device, comprising:

attaching a parent device to a kid device via a manual selection on the parent device or the kid device; after entering a connected state, entering and maintaining a power saving mode as long as a received signal of from the parent device is above a specified threshold, wherein, in the connected state, the kid device is non-discoverable and non-connectable to other devices other than the parent device; leaving the connected state and entering a search mode when the signal of from the parent device falls below the specified threshold, wherein, after leaving the connected state, the kid device is discoverable and connectable, wherein neither the kid device nor the parent device is deactivated if the parent device and the kid device are no longer in communication range; re-entering the connected state and returning to the power saving mode when the parent device signal is reacquired; discovering kid devices in t-he proximity of the parent device; listing discovered kid devices in a user interface of the parent device;

manually selecting a kid device from the listing of discovered kid devices; paging the selected kid device; and if the paging is successfully, transitioning into the connected state.

2. The method of claim 1 wherein the kid device and the parent device comprise a first portable, handheld device and a second portable, handheld device, wherein the first portable, handheld device and the second portable handheld device are Bluetooth-enabled.

3. The method of claim 1, wherein, in the connected state, the kid device can only talk to the parent device.

4. The method of claim 1, comprising:

detaching the parent device from the kid device when the kid device is in the proximity of the parent device.

5. The method of claim 1, comprising:

wirelessly locating the kid device that leaves the connected state by a wireless device other than the parent device.

6. The method of claim 1, comprising:

wirelessly locating the kid device that leaves the connected state by a wireless device other than the parent device, wherein the connected state is a wireless protocol connected state.

7. The method of claim 1 wherein the parent device is a cellular phone.

8. The method of claim 1, comprising:

attaching the kid device to the parent device.

9. The method of claim 1, comprising:

issuing an alarm if an RSSI limit has been traversed or if a response is not received.

10. The method of claim 1, comprising:

entering the search mode when the kid device is lost.

11. The method of claim 1, comprising:

returning to the power saving mode when the received signal is reacquired.

12. The method of claim 1, wherein, in the connected state, the kid device and the parent device negotiate on a sleep time for a hold mode.

13. The method of claim 1, wherein the parent device comprises a Bluetooth-enabled phone.

14. The method of claim 13, wherein the kid device comprises one or more of the following: a wearable device, a wrist band, a faux watch face, an ankle bracelet, a fob and a necklace.

15. A system for tracking a Bluetooth device, comprising: a parent device; and a kid device, wherein the parent device is attached to the kid device via a manual selection on the parent device or the kid device, wherein, the kid device, after entering a connected state, enters and maintains a power saving mode as long as a received signal from the parent device is above a specified threshold, wherein, in the connected state, the kid device is non-discoverable and non-connectable to other devices other than the parent device, wherein the kid device leaves the connected state when the signal from the parent device falls below the specified threshold, wherein, after leaving the connected state, the kid device is discoverable and connectable, wherein neither the kid device nor the parent device is deactivated if the parent device and the kid device are no longer in communication range, wherein the kid device re-enters the connected state and returns to the power saving mode once the parent device signal is reacquired, wherein the parent device is configured to discover kid devices and to list discovered kid devices in a user interface of the parent device, wherein the parent device is configured to facilitate a manual selection of at least one kid device from the listing of the discovered kid devices, and wherein the parent device is configured to page the selected kid device and, if the paging is successful, is configured to transition into the connected state.

16. The system of claim 15 wherein the kid device is wirelessly attached to a parent device.

17. The system of claim 15 wherein the the parent device issues an alarm if an RSSI threshold has been traversed or the kid device does not respond.

18. The system of claim 15 wherein, when the kid device is in a lost state, the kid device adopts a variable duty cycle for active radio transmission.

19. The system of claim 18 wherein the variable duty cycle causes the kid device to actively transmit more frequently in an initial period of the lost state and to actively transmit less frequently in a later period of the lost state.

20. The system of claim 15, wherein the kid device comprises an integrated circuit that includes an application layer.

21. The system of claim 20, wherein the integrated circuit is connected to a Bluetooth radio.

22. The system of claim 20, wherein the application layer returns to the power saving mode when a measured RSSI exceeds a threshold.

23. The system of claim 20, wherein the application layer enters a Bluetooth inquiry mode state when a measured RSSI falls below a threshold.

24. The system of claim 20, wherein the integrated circuit has a unique hardware ID.

25. The system of claim 15 wherein, in the connected state, the kid device and the parent device negotiate on a sleep time.

26. The system of claim 15 wherein the parent device or the kid device comprises a Bluetooth-enabled phone.

27. The method of claim 15, wherein detachment between the parent device and the kid device occurs in proximity of the parent device.

* * * * *